(12) United States Patent
Nakagawa

(10) Patent No.: US 7,720,067 B2
(45) Date of Patent: May 18, 2010

(54) DATA TRANSFER APPARATUS AND TRANSFER CONTROL METHOD

(75) Inventor: Toshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 11/969,763

(22) Filed: Jan. 4, 2008

(65) Prior Publication Data

US 2008/0187075 A1 Aug. 7, 2008

(30) Foreign Application Priority Data

Feb. 6, 2007 (JP) .............................. 2007-026994

(51) Int. Cl.
*H04L 12/28* (2006.01)
*H04J 3/26* (2006.01)
(52) U.S. Cl. ....................... 370/390; 370/432
(58) Field of Classification Search ................. None
See application file for complete search history.

(56) References Cited

U.S. PATENT DOCUMENTS

2004/0027991 A1* 2/2004 Jang et al. .................. 370/230
2004/0255328 A1* 12/2004 Baldwin et al. ............... 725/90
2005/0081244 A1* 4/2005 Barrett et al. ................. 725/97
2006/0083263 A1* 4/2006 Jagadeesan et al. ......... 370/487
2006/0117358 A1* 6/2006 Baldwin et al. ............... 725/90
2006/0117359 A1* 6/2006 Baldwin et al. ............... 725/90
2007/0192812 A1* 8/2007 Pickens et al. ................ 725/94
2007/0214490 A1* 9/2007 Cheng et al. ................ 725/135

FOREIGN PATENT DOCUMENTS

JP 2005-6339 A 1/2005
JP 2005-124193 A 5/2005

* cited by examiner

*Primary Examiner*—Gregory B Sefcheck
*Assistant Examiner*—Suk Jin Kang
(74) *Attorney, Agent, or Firm*—Canon USA Inc IP Division

(57) ABSTRACT

A transfer apparatus includes a control unit to execute control such that one or more of received multicast packets are transferred to at least one receiver, a storage unit to store the received multicast packets or the one or more multicast packets to be transferred to the at least one receiver, and a determining unit to determine whether transfer of the stored multicast packet can be started when a multicast subscribe request is received from the receiver. The control unit transfers the multicast packet based on a determination result of the determining unit such that the multicast packet which is to be first transferred to the at least one is a head packet of a frame coded by a first coding technique which does not require information of any other frames when the multicast packet is decoded.

3 Claims, 9 Drawing Sheets

DATA TRANSFER APPARATUS AND TRANSFER CONTROL METHOD

BACKGROUND OF THE INVENTION

1. Field of the Invention

The present invention relates to a technique suitable for use in transmitting and transferring a multicast packet.

2. Description of the Related Art

In the Internet environment, broadband networks have recently progressed with more widespread use of ADSL (Asynchronous Digital Subscriber Line) and FTTH (Fiber To The Home). Processing performance of various computing devices, including a personal computer (PC), has also been improved remarkably.

Against such background of a tendency toward performance improvements in the communication environment and the data processing environment, a streaming technique has been practiced which delivers multimedia data, e.g., moving images (pictures) and voices (sounds), via a network in real time. With the practical use of the streaming technique, users can look and listen to broadband broadcasting of live media or recorded media, as well as recorded media on demand.

Communication methods called unicast and multicast are generally used for delivery of those video contents. The term "unicast" means a technique for communication on the basis of a 1:1 relation. In the case of unicast, when a packet is transmitted to a plurality of communication partners, a data transmitter is required to copy the packet in the same number as the communication partners and to transmit the copied packets.

On the other hand, the term "multicast" means a technique for transmitting one packet to a large number of particular communication partners. The packet transmitted by multicast is copied by appropriate data transfer apparatuses disposed on a communication path and is then transmitted to the large number of particular communication partners, i.e., respective data receivers.

Because multimedia data (particularly moving image data) has a too large data amount to transmit the data as it is, the multimedia data is usually subjected to coding before the delivery. Therefore, various coding techniques have been proposed to realize a high compression rate while suppressing deterioration of images. For example, MPEG-2 and MPEG-4 are typical coding techniques which are standardized as international standards by ISO (International Organization for Standardization).

With the MPEG coding techniques, such as MPEG-2 and MPEG-4, the predictive coding technique is applied to each of frames making up the moving image data. Depending on the kind of predictive coding technique applied, each frame is classified into one of three frames, i.e., an I frame, a P frame, and B frame.

Of the three frames, the I frame represents an intra-frame coded image. The P frame represents an inter-frame forward prediction coded image using a past image frame with respect to the coding target frame. The B frame represents an inter-frame bidirectional prediction coded image using past and future image frames with respect to the coding target frame. Among those three coded frames, only the I frame can be decoded without using information of any other image frames.

Various techniques using those frames are proposed. For example, Japanese Patent Laid-Open No. 2005-6339 proposes a method of, in order to speed up the start of viewing for presentation, transmitting a main video stream and an alternative video stream, and causing a receiver to initially tune with the alternative video stream and to tune with the main video stream when the next GOP of the main video stream appears. Further, Japanese Patent Laid-Open No. 2005-124193 proposes a method of, in order to reduce time waiting for presentation of video when a video channel is changed from one to another, holding at least one independent frame for each video channel and transmitting the independent frame to a client at a request source via unicast communication.

In the delivery of video content by multicast, the packet is automatically copied for transfer by the data transfer apparatus disposed on the communication path. In the case of moving image data coded by the MPEG coding technique, a head packet received from a data transmitter is not always the head packet of the I frame at the time when the data transfer apparatus receives a multicast delivery request from the data receiver.

If the received head packet is not the head packet of the I frame, copying and transfer of packets are started from the packet of the P frame or the B frame. Accordingly, the data receiver cannot normally decode and reproduce the video content until the head packet of the I frame is received. Another problem is that a useless process of decoding and abandoning the unnecessary P or B frame is executed until the head packet of the I frame is received.

SUMMARY OF THE INVENTION

In view of the above-described problems, the present invention is directed to a data transfer apparatus and a transfer control method which enable, in delivery of video content by multicast, data transfer to be started from the head packet of the I frame when a multicast delivery request is issued from a data receiver.

More specifically, in a transfer apparatus configured to receive multicast packets of moving image data transmitted via a network and to transfer the multicast packets to receivers connected to the transfer apparatus via a network, the transfer apparatus includes a control unit configured to execute control such that one or more of the multicast packets are transferred to at least one receiver in response to a multicast subscribe request received by the transfer apparatus from the at least one receiver, a storage unit configured to store the multicast packets or the one or more of the multicast packets to be transferred to the at least one receiver, and a determining unit configured to determine whether transfer of the multicast packet stored in the storage unit can be started when the multicast subscribe request is received from the at least one receiver, wherein the control unit transfers the multicast packet based on a determination result of the determining unit such that the multicast packet which is to be first transferred to the at least one receiver is a head packet of a frame coded by a first coding technique which does not require information of any other frames when the multicast packet is decoded after the multicast packet has been transferred to the at least one receiver.

According to the present invention, in delivery of video content by multicast, data transfer can be started from the head packet of the I frame. On the data receiver side, therefore, each data receiver can reliably execute an effective decoding process immediately after receiving a frame which has first arrived. As a result, a useless process of decoding and abandoning the unnecessary frame can be avoided. For example, the reproduction efficiency of a moving image multicast stream, which has been coded by the MPEG coding technique, can be improved.

Further features of the present invention will become apparent from the following description of exemplary embodiments with reference to the attached drawings.

DESCRIPTION OF THE EMBODIMENTS

Figure 1:
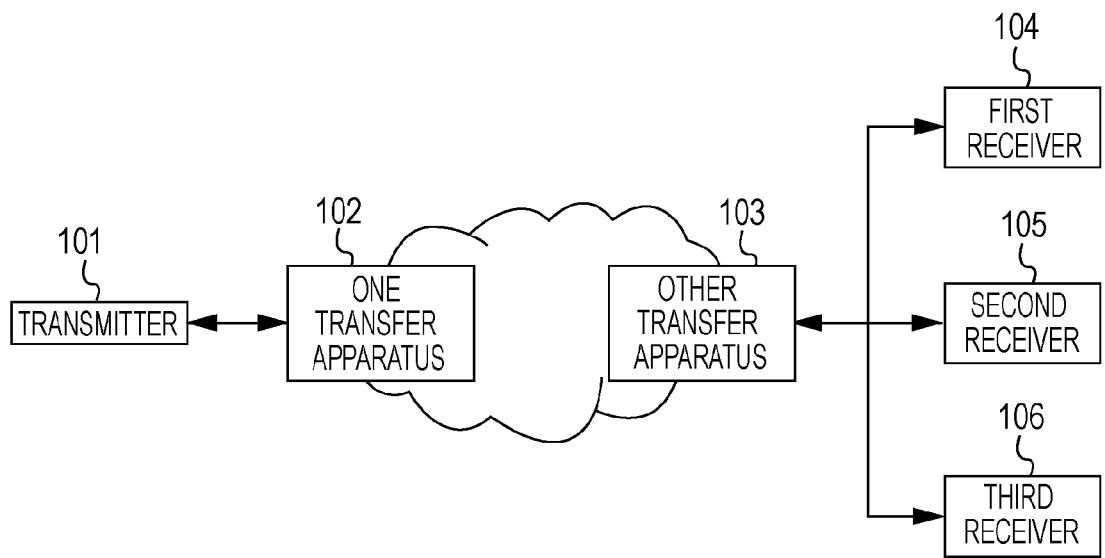
FIG. 1 is a block diagram showing an overall configuration of a system which includes a data transmitter and a data transfer apparatus according to a first exemplary embodiment of the present invention.

Exemplary embodiments of the present invention will be described in detail below with reference to the attached drawings. It is to be noted that components used in the exemplary embodiment are described merely by way of example and the scope of the present invention should not be construed as being limited to the use of those components. Throughout the drawings referred to in the following exemplary embodiments, the same or corresponding parts are denoted by the same reference numerals.

First Exemplary Embodiment

A first exemplary embodiment of the present invention will be first described in detail with reference to the attached drawings.

FIG. 1 is a block diagram showing an overall configuration of a system which includes a data transmitter and a data transfer apparatus according to the first exemplary embodiment.

As shown in FIG. 1, when communication is performed between a data transmitter 101 and a plurality of data receivers (e.g., when communication of multicast packets is performed between the data transmitter 101 and each of a first data receiver 104, a second data receiver 105, and a third data receiver 106), data (packets) is transmitted and received through one data transfer apparatus 102 and the other data transfer apparatus 103 which are both connected to a network.

The data transmitter 101 transmits moving image data, which has been subjected to coding, to a predetermined destination through the one data transfer apparatus 102. The first to third data receivers 104-106 are connected to the network through the other data transfer apparatus 103. To receive a multicast packet transmitted from the data transmitter 101, each of the first to third data receivers 104-106 transmits a multicast subscribe request to the other data transfer apparatus 103. The other data transfer apparatus 103 copies the multicast packet and transfers it to the data receiver which has transmitted the multicast subscribe request.

Figure 2:
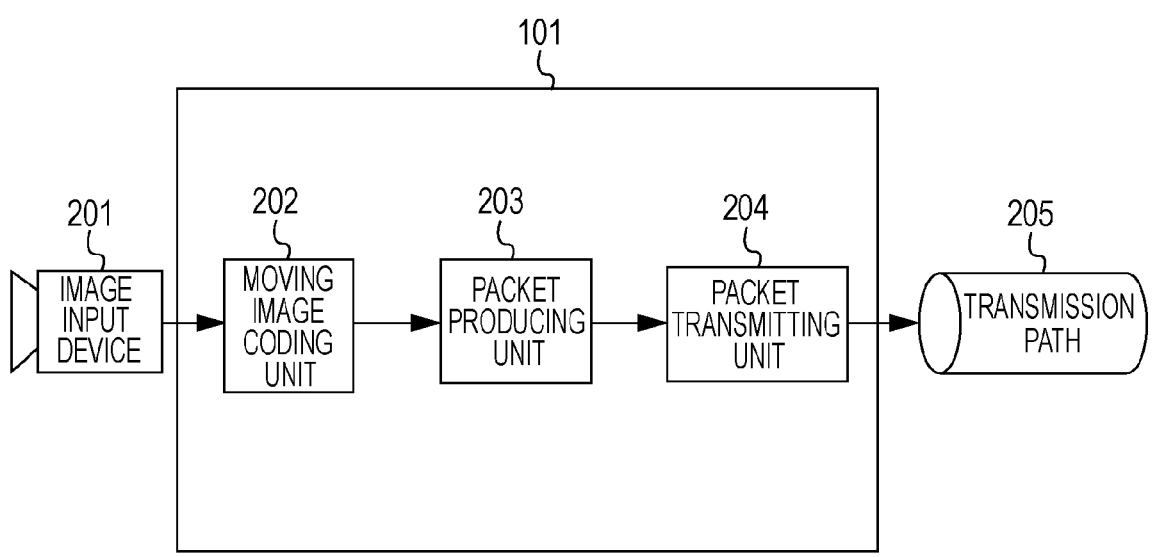
FIG. 2 is a block diagram showing an exemplary functional configuration of the data transmitter in the first exemplary embodiment of the present invention.

FIG. 2 is a block diagram showing an exemplary functional configuration of the data transmitter 101 in the first exemplary embodiment.

As shown in FIG. 2, the data transmitter 101 includes a moving image coding unit 202, a packet producing unit 203, and a packet transmitting unit 204. Numeral 205 in FIG. 2 denotes a transmission path representing one of various networks. In the illustrated exemplary embodiment, the transmission path 205 is a network adapted for transmitting packets of moving image data.

The moving image coding unit 202 executes coding of the moving image data, which is input from a video input device 201 such as a video camera or a Web camera, in accordance with the MPEG-4 coding technique. The moving image data having been subjected to the coding in the moving image coding unit 202 is input to the packet producing unit 203 on the frame-by-frame basis.

Figure 3:
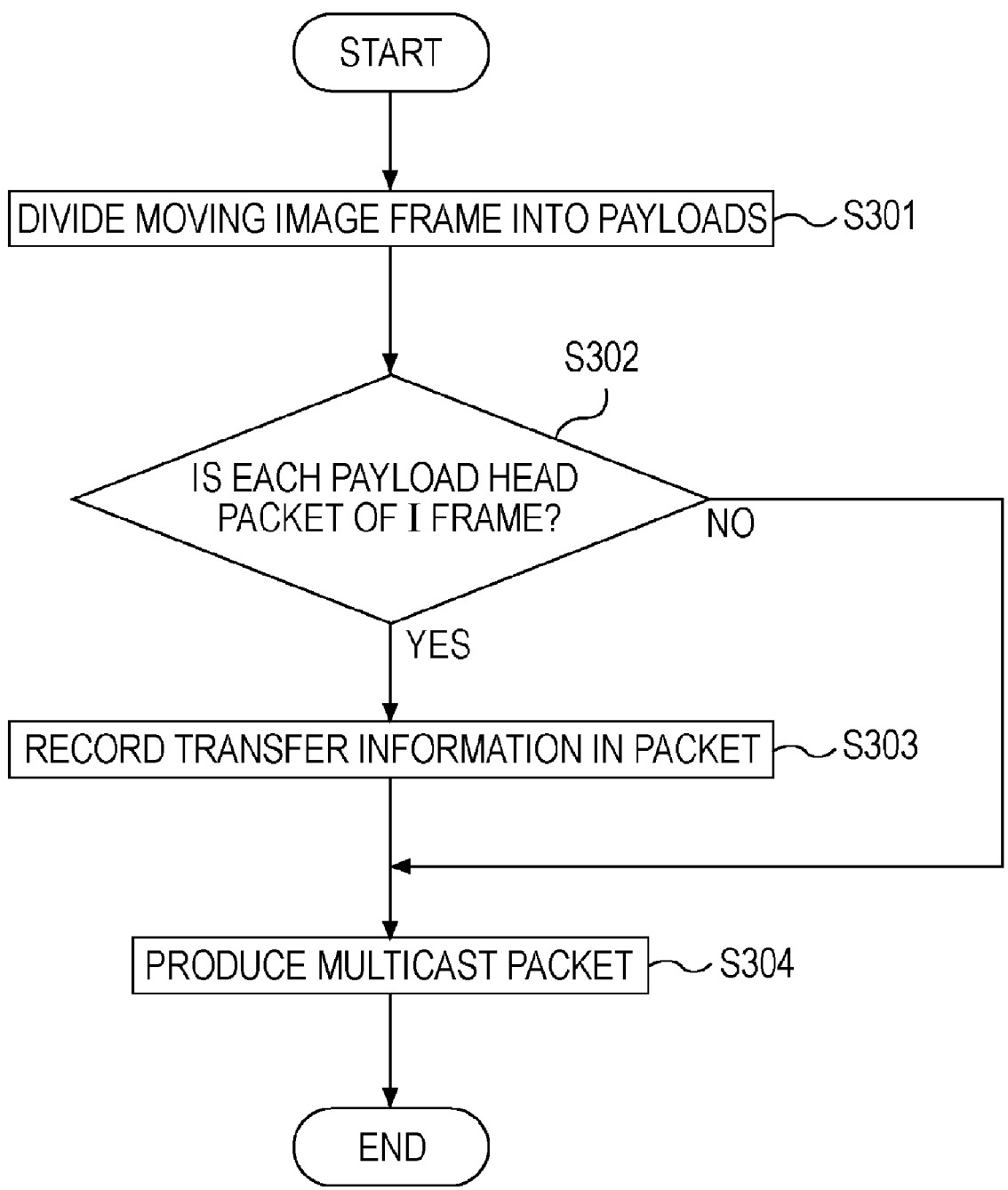
FIG. 3 is a flowchart showing an exemplary procedure for a packet producing process executed by a packet producing unit in the first exemplary embodiment of the present invention.

FIG. 3 is a flowchart showing an exemplary procedure for a packet producing process executed by the packet producing unit 203 of the data transmitter 101 in the first exemplary embodiment.

First, the packet producing unit 203 converts each frame of the input moving image data to payloads (step S301). The frame of the moving image data can be usually converted to payloads by dividing each frame into plural parts in units of the so-called MTU size that is a maximum value of data transmittable via a communication network, or in units of the so-called video packet. For simplicity of the explanation, the first exemplary embodiment is described on the assumption that one frame is included as a payload of one packet.

Then, it is determined whether each payload of the divided frame is a head packet of the I frame (step S302). In other words, if one frame is included as a payload of one packet as a result of step S301, it is determined whether the relevant frame is the I frame.

If the determination result indicates that the payload is the head packet of the I frame, transfer start information is recorded in the head packet (step S303). Then, a multicast packet including the transfer start information is produced (step S304) and the packet producing process for each frame of the moving image data is brought to an end. On the other hand, if the determination result in step S302 indicates that the payload is not the head packet of the I frame, a usual multicast packet is produced (step S304) and the packet producing process for each frame of the moving image data is brought to an end.

With the above-described process, the moving image data input to the packet producing unit 203 is converted to a packet, and the produced multicast packet is transmitted to a predetermined destination, i.e., a multicast address or a multicast post, from the transmitting unit 204.

Figure 4:
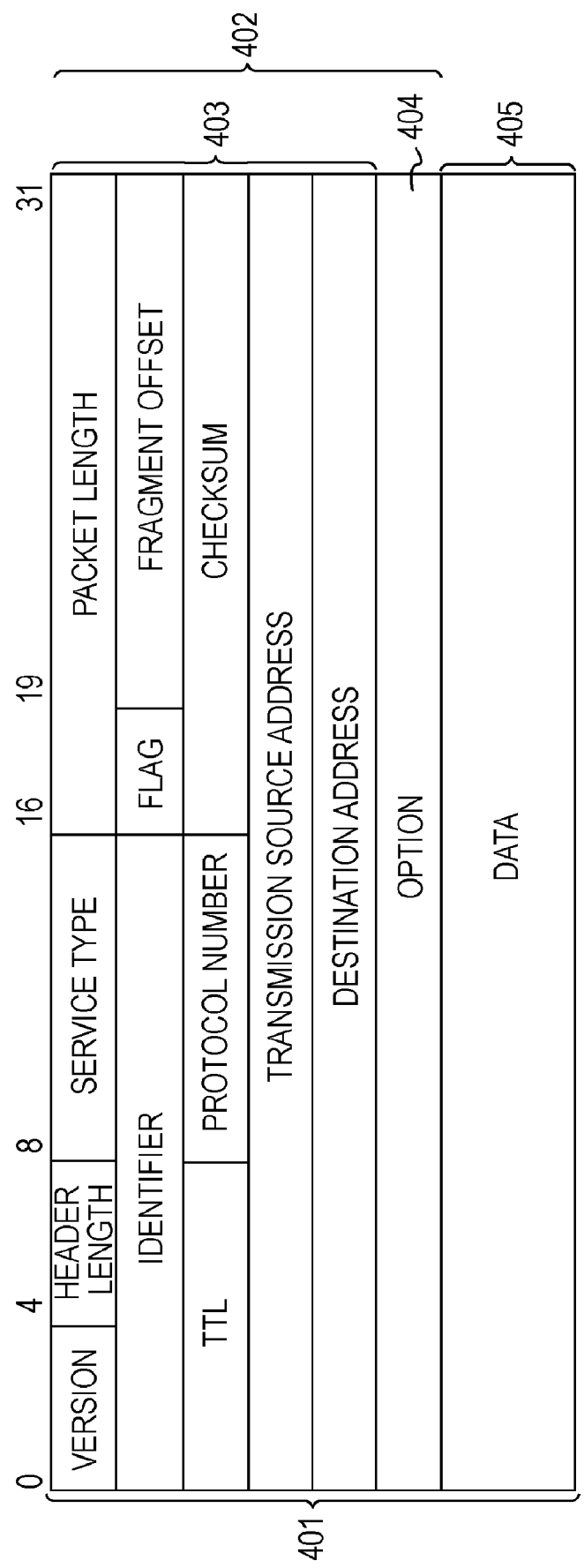
FIG. 4 illustrates a detailed structure of an IP packet transmitted from a data transmitter in the first exemplary embodiment of the present invention.

FIG. 4 illustrates a detailed structure of an IP packet produced by the packet producing unit 203 of the data transmitter 101 in the first exemplary embodiment.

As illustrated in FIG. 4, an IP packet 401 is made up of two portions, i.e., a header portion 402 and a data portion 405 carried by the IP packet 401. In the first exemplary embodiment, the moving image data divided into payloads by the packet producing unit 203 is loaded in the data portion 405.

The header portion 402 is further made up of two portions, i.e., a fixed length portion 403 (20 bytes at the head) and an option portion 404. In the option portion 404, extension information with a variable length is set in units of 4 bytes (32 bits) up to 40 bytes at maximum. The option portion 404 is an area for recording information that is utilized to various additional functions related to the transmission of the IP packet. In the first exemplary embodiment, the transfer start information is recorded in the option portion 404.

Figure 5:
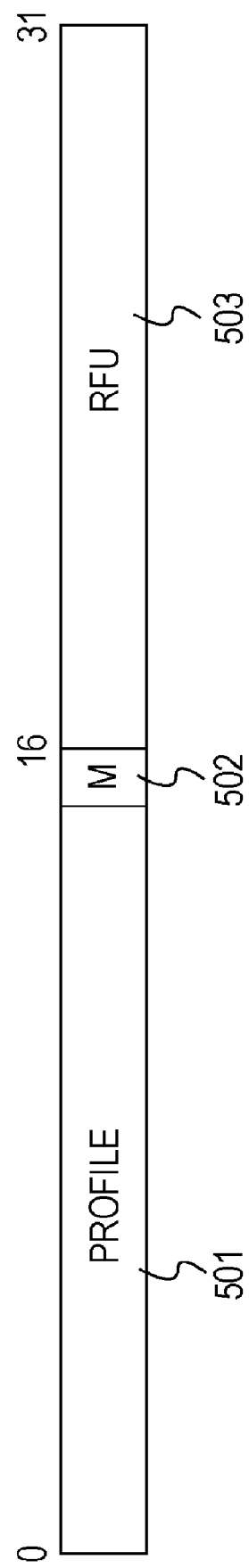
FIG. 5 illustrates an exemplary structure of extension information in the IP packet illustrated in FIG. 4.

FIG. 5 illustrates an exemplary detailed structure of the option portion 404 illustrated in FIG. 4.

A profile 501 is a 16-bit width field used to identify the information included in the option portion 404. In the first exemplary embodiment, "0x001" indicating the inclusion of the transfer start information is always recorded in the profile 501.

Numeral 502 denotes a marker bit. The marker bit 502 is set to "1" if the relevant multicast packet is a packet capable of starting its transfer, and is set to "0" if not so. RFU (Reserved For Future Use) 503 is a 15-bit area that is reserved for extension in future.

Figure 6:
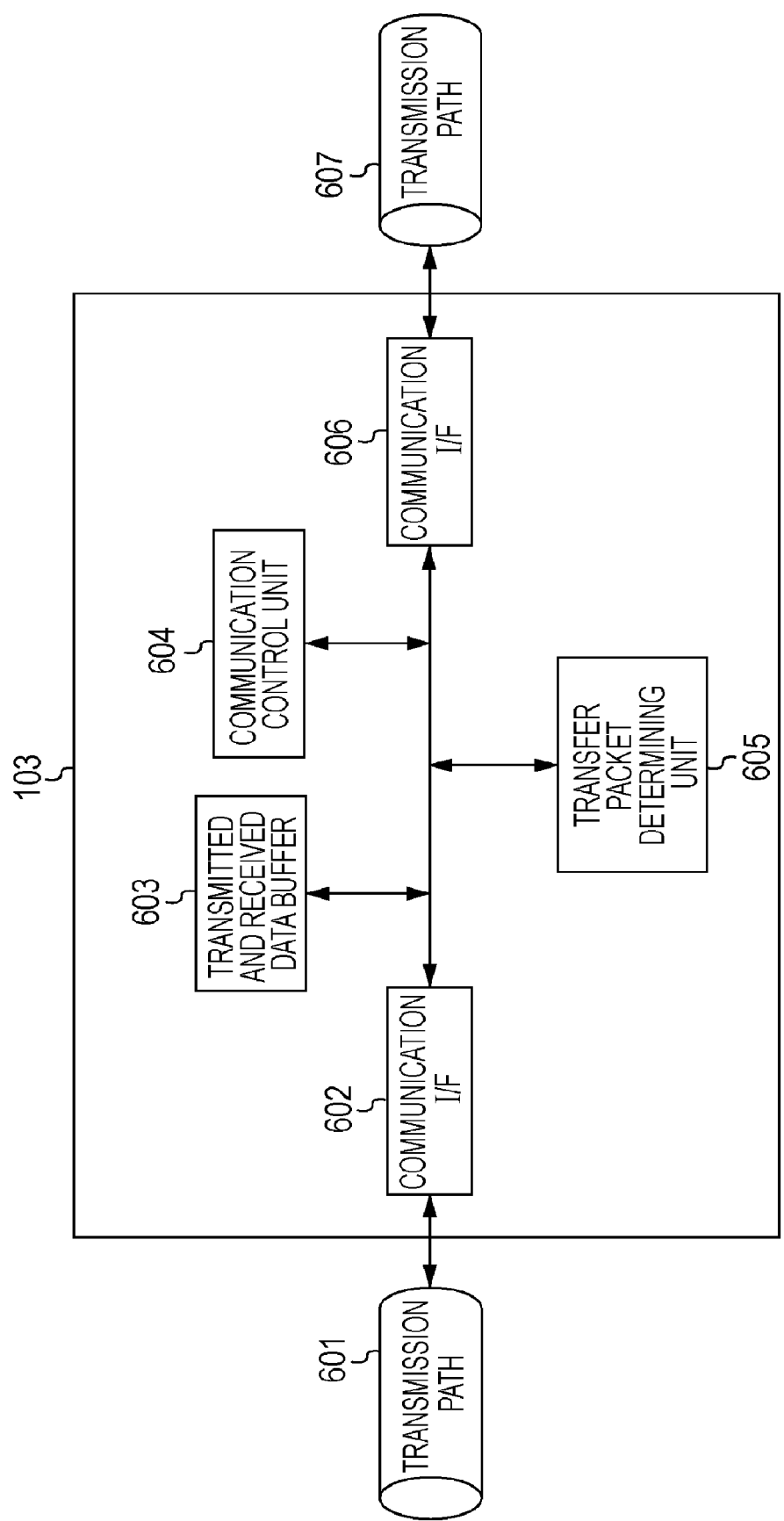
FIG. 6 is a block diagram showing an exemplary functional configuration of the data transfer apparatus according to the first exemplary embodiment of the present invention.

FIG. 6 is a block diagram showing an exemplary functional configuration of the other data transfer apparatus 103 according to the first exemplary embodiment.

As shown in FIG. 6, the other data transfer apparatus 103 includes communication interfaces (I/F) 602 and 606, a transmitted and received data buffer 603, a communication control unit 604, and a transfer packet determining unit 605. The transmitted and received data is stored in the transmitted and received data buffer 603 by using a storage unit (not shown).

In FIG. 6, numerals 601 and 607 denote transmission paths each representing one of various networks. In the illustrated exemplary embodiment, the transmission paths 601 and 607 are each a network adapted for transmitting and receiving the moving image data (multicast packets). When the other data transfer apparatus 103 performs communication with the exterior, data is transmitted and received through the communication interfaces 602 and 606 which are connected respectively to the transmission paths 601 and 607. The data to be transmitted and received is temporarily stored in the transmitted and received data buffer 603, and the transmission paths and a protocol, which are used to transmit the data, are controlled by the communication control unit 604.

Figure 7:
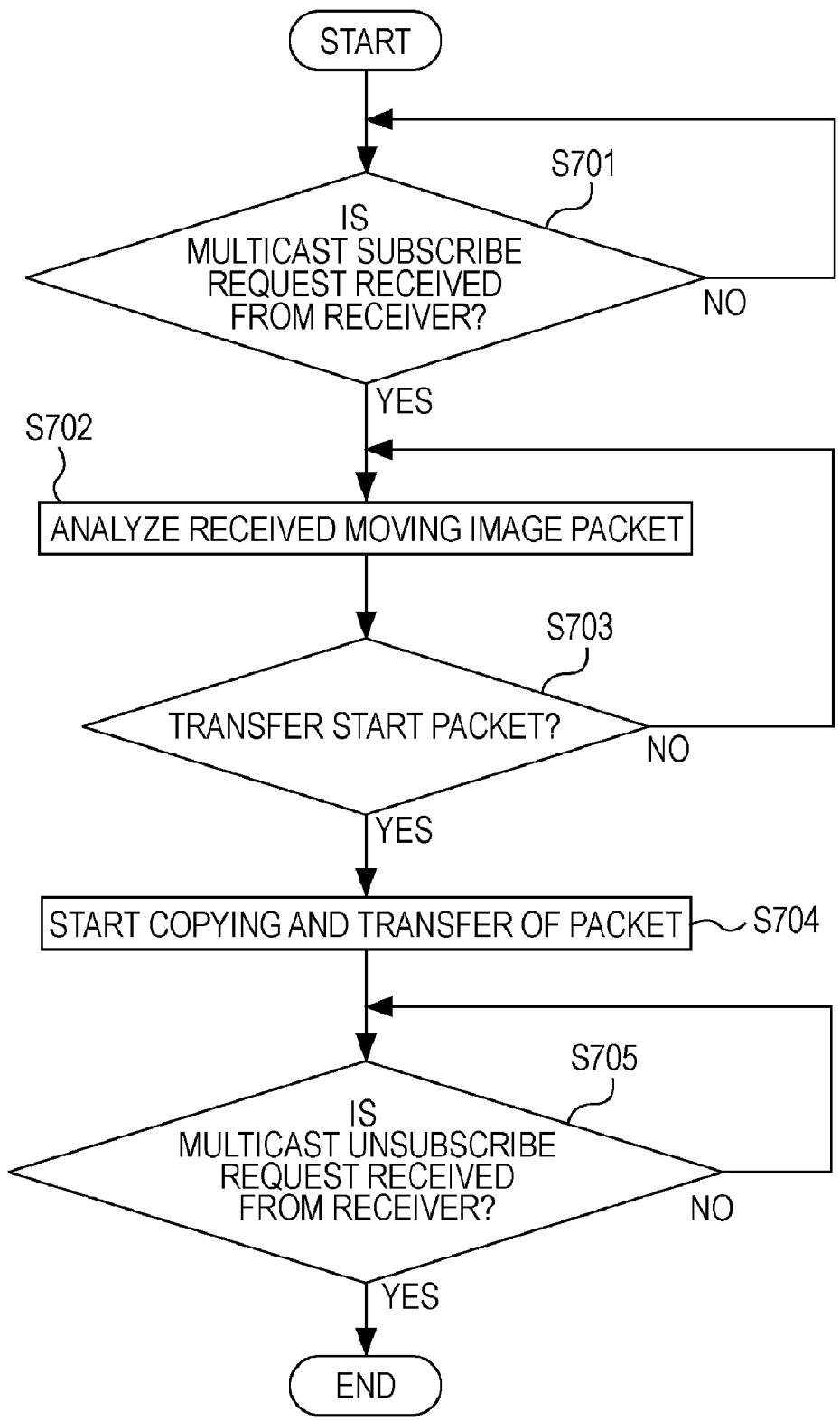
FIG. 7 is a flowchart showing an exemplary procedure for a multicast packet transfer process executed by the data transfer apparatus according to the first exemplary embodiment of the present invention.

FIG. 7 is a flowchart showing an exemplary procedure for a process of transferring the multicast frame, which has been transmitted from the data transmitter 101, to the first to third data receivers 104-106 by the other data transfer apparatus 103 in the first exemplary embodiment.

Initially, the other data transfer apparatus 103 determines whether a multicast subscribe request is received from any of the first to third data receivers 104-106 (step S701). In IPv4, a Join message of IGMP (Internet Group Management Protocol) is used as the multicast subscribe request. IGMP is a protocol for management of multicast groups. The communication control unit 604 processes subscribe and unsubscribe messages from the first to third data receivers 104-106 for each multicast group, and it transmits the multicast packet to the interface at which the subscriber is present.

If the determination result of step S701 indicates that the multicast subscribe request is not received, the communication control unit 604 waits until the multicast subscribe request is received. On the other hand, if the determination result of step S701 indicates that the multicast subscribe request is received, the transfer packet determining unit 605 analyzes a moving image packet (multicast packet) received from the data transmitter 101 (step S702). Then, it is determined whether the analyzed packet is a transfer start packet (step S703). In the illustrated exemplary embodiment, such determination can be made based on the information that has been recorded in the option portion 404 of the header portion 402 by the data transmitter 101. More specifically, if the marker bit 502 shown in FIG. 5 is set to "0", the analyzed packet is determined to be not the transfer start packet, and if it is set to "1", the analyzed packet is determined to be the transfer start packet.

If the determination result of step S703 indicates that the analyzed packet is not the transfer start packet, the processing flow is returned to step S702 to analyze the header extension information of the received multicast packet. On the other hand, if the determination result of step S703 indicates that the analyzed packet is the transfer start packet, the relevant packet is copied and transferred to each of the first to third data receivers 104-106 which has issued the multicast subscribe request (step S704).

Next, it is determined whether a multicast unsubscribe request is received from any of the first to third data receivers 104-106 (step S705). If the determination result of step S705 indicates that the multicast unsubscribe request is not received, the communication control unit 604 continues the transfer of the multicast packet and waits in such a state. On the other hand, if the determination result of step S705 indicates that the multicast unsubscribe request is received, the transfer of the multicast packet to each of the first to third data receivers 104-106, which has issued the multicast unsubscribe request, is brought to an end.

Figure 8:
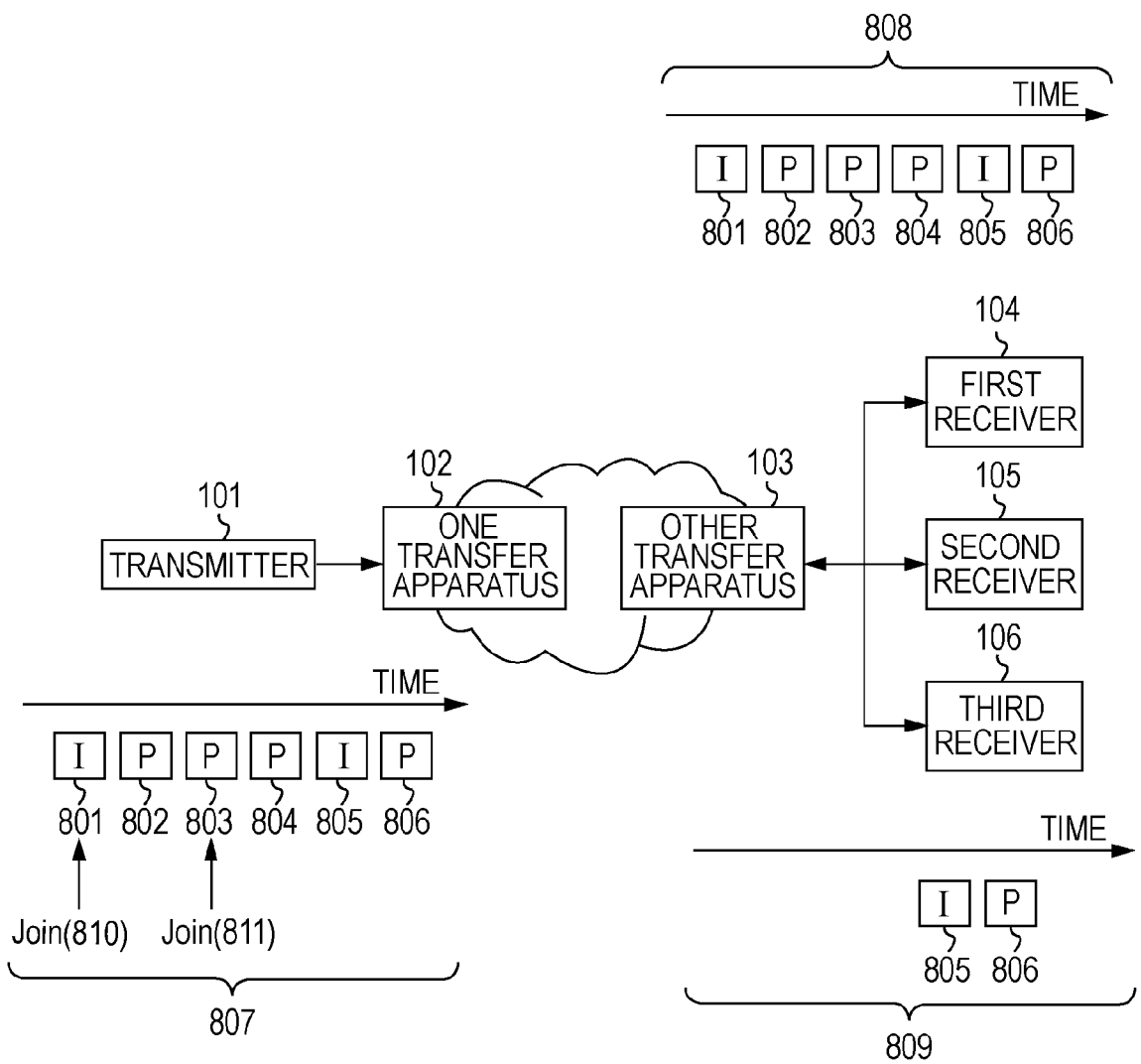
FIG. 8 illustrates the relationship between multicast packets transmitted from the data transmitter and multicast packets transferred to receivers by the data transfer apparatus in the first exemplary embodiment of the present invention.

FIG. 8 illustrates the relationship between multicast packets transmitted from the data transmitter 101 to the other data transfer apparatus 103 and multicast packets transferred from the other data transfer apparatus 103 to the first data receiver 104 and the third data receiver 106 in the first exemplary embodiment.

Numeral 807 denotes a multicast stream transmitted from the data transmitter 101. The data transmitter 101 transmits packets successively in the order of a first packet 801, a second packet 802, a third packet 803, etc. with the lapse of time. For simplicity of the explanation, it is assumed in the first exemplary embodiment that one frame is included in one packet. The first packet 801 and the fifth packet 805 are each constituted by the I frame, and the other second to fourth and sixth packets 802-804 and 806 are each constituted by the P frame.

When the other data transfer apparatus 103 receives a multicast subscribe request 810 from the first data receiver 104, the other data transfer apparatus 103 copies the multicast packets, which have been transmitted from the data transmitter 101 through the one data transfer apparatus 102, in the predetermined order from the first packet 801. The copied multicast packets are transferred to the first data receiver 104. Thus, the multicast packets transmitted from the data transmitter 101 are immediately copied and transferred to the first data receiver 104, which has issued the multicast subscribe request 810, at the timing when the other data transfer apparatus 103 receives the first packet 801 constituted by the I frame. As a result, the first data receiver 104 can receive a multicast stream 808 and can correctly decode and reproduce the moving image data.

Meanwhile, the other data transfer apparatus 103 receives the multicast subscribe request from the third data receiver 106 at the same timing as when the other data transfer apparatus 103 receives the third packet 803 from the data transmitter 101. In that case, because the third packet 803 and the fourth packet 804 are each the multicast packet constituted by the P frame, copying and transfer of packets to the third data receiver 106 are not executed. Thereafter, when the other data transfer apparatus 103 receives the fifth packet 805 constituted by the I frame for the first time, the other data transfer apparatus 103 starts copying of packets transferred to the third data receiver 106 and transmits successive packets starting from the fifth packet 805 in the predetermined order to the third data receiver 106. In such a way, the third data receiver 106 can receive a multicast stream 809 and can correctly decode and reproduce the moving image data.

As described above, the data transmitter 101 in the first exemplary embodiment executes coding of the moving image data on the frame-by-frame basis in combination of the I frame which does not require information of any other frames when the moving image data is decoded, and the P frame which requires information of the other frame when the moving image data is decoded. Further, the multicast packet is transmitted by setting the marker bit 502 in the head packet of the I frame to "1". The other data transfer apparatus 103 in the first exemplary embodiment controls copying and transfer of packets to the data receiver, which has issued the multicast subscribe request, by referring to the setting of the marker bit 502 in the head packet and determining whether the relevant packet can be transferred. On the data receiver side, therefore, each data receiver can reliably reproduce the moving image stream which has been coded in accordance with the MPEG coding technique. In addition, since copying and transfer of useless multicast packets are not executed, a band of the transmission path can be more effectively utilized.

Second Exemplary Embodiment

In the above-described first exemplary embodiment, the other data transfer apparatus 103 starts copying and transfer of packets from the head packet of the next I frame transmitted after the time when the other data transfer apparatus 103 has received the multicast subscribe request. Meanwhile, in a second exemplary embodiment, the other data transfer apparatus 103 executes processing so as to start the transfer of packets to the data receiver from the head packet of the just preceding I frame.

Figure 9:
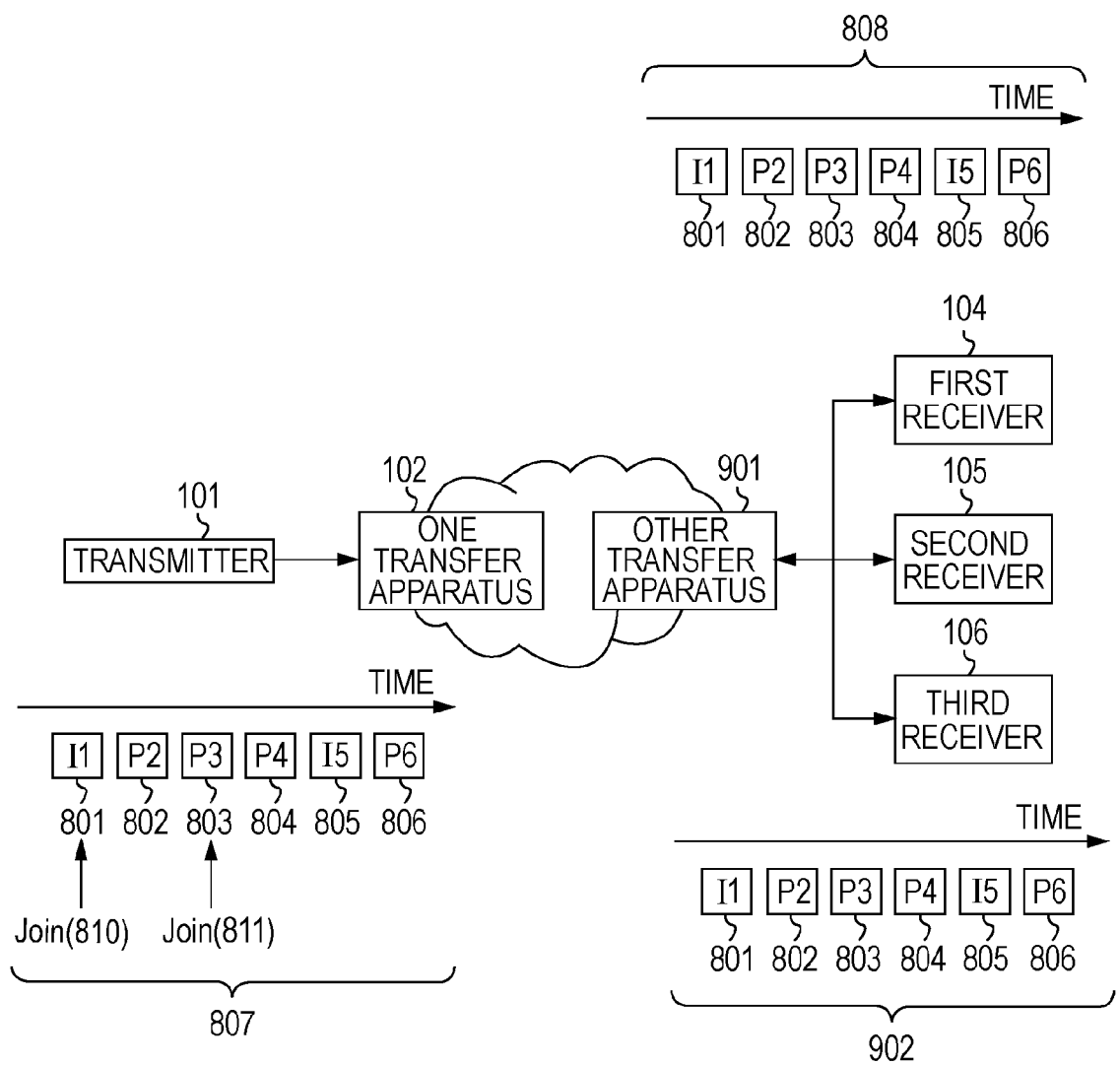
FIG. 9 illustrates the relationship between multicast packets transmitted from the data transmitter and multicast packets transferred to the receivers by a data transfer apparatus in a second exemplary embodiment of the present invention.

FIG. 9 illustrates the relationship between multicast packets transmitted from the data transmitter 101 and multicast packets transferred from the other data transfer apparatus 901 to the first data receiver 104 and the third data receiver 106 in the second exemplary embodiment. Note that, as illustrated in FIG. 9, a multicast stream 807 transmitted from the data transmitter 101 and a multicast stream 808 transferred from the other data transfer apparatus 901 to the first data receiver 104 are the same as those in the first exemplary embodiment. Accordingly, those multicast streams are denoted by the same numerals (807 and 808) as those in the first exemplary embodiment. Further, because the functional configuration of the other data transfer apparatus 901 is the same as that of the other data transfer apparatus 103 in the first exemplary embodiment, a description thereof is not repeated here.

Numeral 902 denotes a multicast stream transferred from the other data transfer apparatus 901 to the third data receiver 106. The multicast stream 902 is transferred in the predetermined order from the first packet 801, i.e., the I frame which is positioned at earlier timing than the multicast subscribe request 811 transmitted from the third data receiver 106. In a transmitted and received data buffer 603 of the other data transfer apparatus 901 in the second exemplary embodiment, a frame group from the packet of the just preceding I frame to the packet at the current time is recorded in units of GOV (Group of Video Object Plane) at maximum. The past GOV data is abandoned for update. The term "GOV" means a frame group from one I frame of an MPEG moving image to the frame just before the next I frame.

The multicast packets temporarily stored in the transmitted and received data buffer 603 are each analyzed and packet transfer to the third data receiver 106 is started from the head packet of the just preceding I frame. Therefore, the moving image data can be quickly reproduced in all the data receivers. Further, as in the first exemplary embodiment, multicast packets of the coded moving image data can be transferred so that the multicast packets are reliably reproduced in each data receiver.

Third Exemplary Embodiment

In the above-described second exemplary embodiment, the other data transfer apparatus 901 copies and transfers all packets of the moving image data recorded in the transmitted and received data buffer 603. Meanwhile, in a third exemplary embodiment, only the I frame at the head is copied and transferred to the data receiver which has issued the multicast subscribe request.

Figure 10:
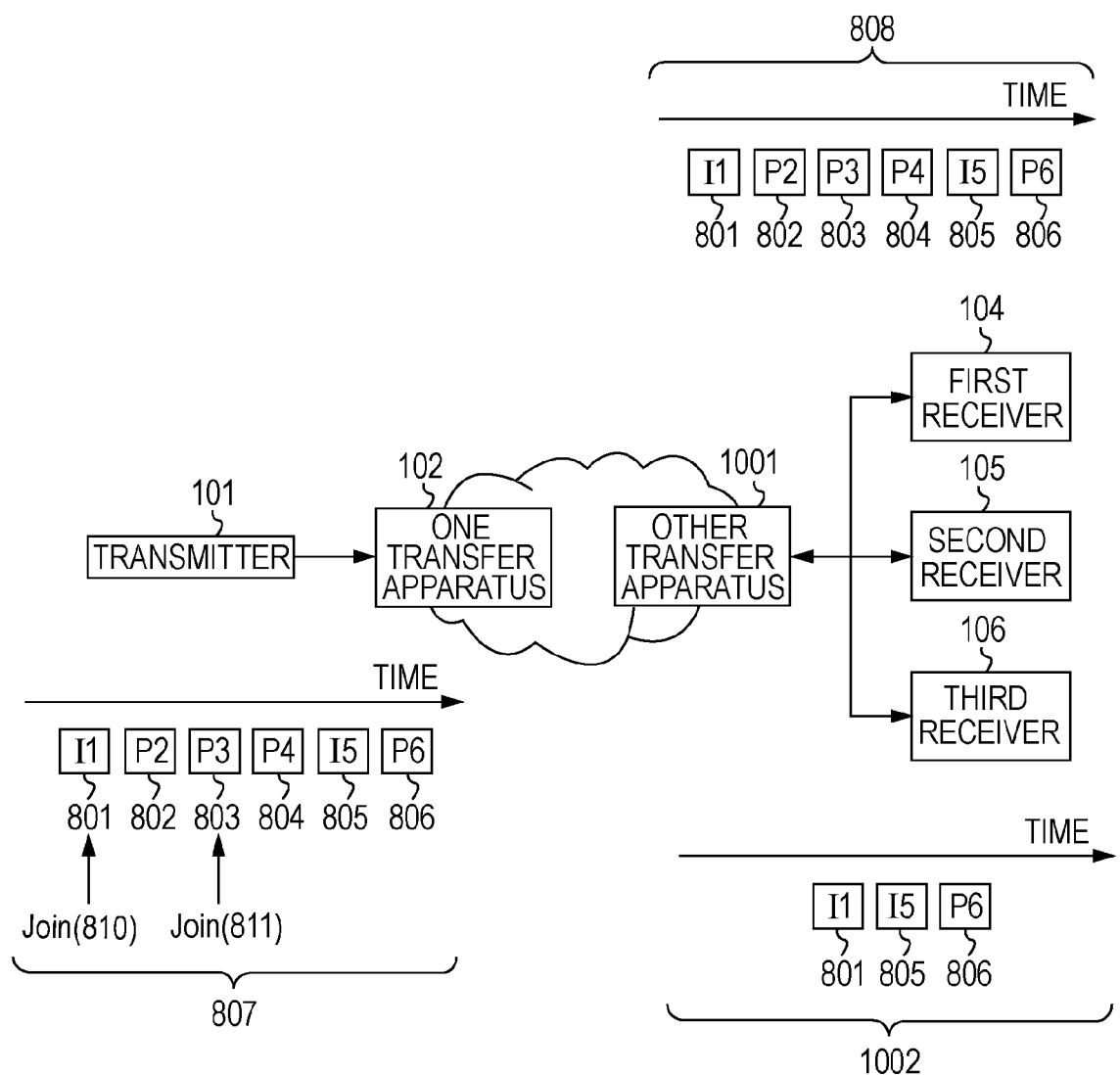
FIG. 10 illustrates the relationship between multicast packets transmitted from the data transmitter and multicast packets transferred to the receivers by a data transfer apparatus in a third exemplary embodiment of the present invention.

FIG. 10 illustrates the relationship between multicast packets transmitted from the data transmitter 101 and multicast packets transferred from the other data transfer apparatus 1001 to the first data receiver 104 and the third data receiver 106 in the third exemplary embodiment. Note that, as illustrated in FIG. 10, a multicast stream 807 transmitted from the data transmitter 101 and a multicast stream 808 transferred from the other data transfer apparatus 1001 to the first data receiver 104 are the same as those in the first exemplary embodiment. Accordingly, those multicast streams are denoted by the same numerals (807 and 808) as those in the first exemplary embodiment. Further, because the functional configuration of the other data transfer apparatus 1001 is the same as that of the other data transfer apparatus 103 in the first exemplary embodiment, a description thereof is not repeated here.

Numeral 1002 denotes a multicast stream transferred from the other data transfer apparatus 1001 to the third data receiver 106. In the multicast stream 1002, the first packet 801 is initially transferred which is positioned at earlier timing than the multicast subscribe request 811 transmitted from the third data receiver 106. Thereafter, without transferring the second to fourth packets 802-804 which are each constituted by the P frame, the multicast stream 1002 is transferred in a predetermined order from the fifth packet 805 which is constituted by the next I frame.

With the other data transfer apparatus 1001 according to the third exemplary embodiment, only the I frames are transferred to the third data receiver 106, which has transmitted the multicast subscribe request 811, immediately after the start of the packet transfer. Therefore, the third exemplary embodiment can realize cutting of the communication band used and a reduction of processing loads that are required to decode and reproduce moving images in each data receiver. In addition, multicast packets of the coded moving image data can be transferred so that the multicast packets are reliably reproduced in the data receiver.

Fourth Exemplary Embodiment

In the above-described second exemplary embodiment, the other data transfer apparatus 901 records all packets from one I frame to the next I frame. Meanwhile, in a fourth exemplary embodiment, only the I frames are recorded. The other data transfer apparatus 901 in the second exemplary embodiment requires a memory capacity capable of recording the moving image data in units of GOV at maximum. Therefore, when an available memory capacity is limited, there is a possibility that the memory capacity is insufficient depending on the bit rate or the frame rate of moving images.

With the other data transfer apparatus according to the fourth exemplary embodiment, only the I frames are recorded in the transmitted and received data buffer. Thus, only the I frames are transferred to the data receiver, which has transmitted the multicast subscribe request, after the start of the packet transfer. As a result, the fourth exemplary embodiment can realize cutting of the memory capacity used, cutting of the communication band used, and a reduction of processing loads that are required to decode and reproduce moving images in each data receiver. In addition, as in the second exemplary embodiment, multicast packets of the coded moving image data can be transferred so that the multicast packets are reliably reproduced in the data receiver.

Fifth Exemplary Embodiment

In the above-described first exemplary embodiment, the other data transfer apparatus 103 analyzes the information that has been recorded in the packet header by the data transmitter 101, and determines the transfer start packet which is to be transferred to the data receiver. Meanwhile, in a fifth exemplary embodiment, the transfer start packet to be transferred to the data receiver is determined by analyzing payload data of each packet.

With the other data transfer apparatus according to the fifth exemplary embodiment, whether the relevant packet is the head packet of the I frame is determined by analyzing the payload data of each packet. Therefore, the fifth exemplary embodiment is adaptable for multicast packets transmitted from a usual data transmitter which does not employ the option field of the packet header, and can transfer multicast packets of the coded moving image data so that the multicast packets are reliably reproduced in each data receiver.

Other Exemplary Embodiments

While in the above-described exemplary embodiments the data transmitter 101 has the function of coding the moving image data, the moving image coding unit 202 and the data transmitter 101 can be constituted as separate units. Also, while the exemplary embodiments have been described as receiving the multicast subscribe requests transmitted from two (first and third) data receivers for simplicity of the explanation, three or more data receivers can issue the multicast subscribe requests.

In the above-described exemplary embodiments, MPEG-4 is used as the coding technique for the moving image data and IP is used as the network protocol for communication of the coded moving image data. However, the coding technique for the moving image data is not limited to MPEG-4, and can also be practiced, for example, in combination of the intra-frame predictive coding and the inter-frame predictive coding, such as MPEG-2 and H.264. In a broader sense, suitable one of coding techniques for moving image data is usable which can perform coding of the data on the frame-by-frame basis in combination of two coding techniques, i.e., one which does not require information of any other frames when the moving image data is decoded, and the other which requires information of the other frame when the moving image data is decoded. Further, the network protocol is not limited to the IP and other suitable network protocols can also be used.

The above-described exemplary embodiments can also be practiced in software configuration by using computer (or a CPU or an MPU) incorporated in a system or an apparatus. Therefore, a computer program supplied to the computer and installed therein to realize the functions and the processes required in the present invention also serves to implement the present invention. In other words, the computer program to realize the functions and the processes required in the present invention is also involved in the present invention. In that case, the computer program can be practiced in various forms, e.g., object code, a program executed by an interpreter, and script data supplied to OS, so long as it has a program function.

In the above case, the computer program to realize the functions and the processes required in the present invention is supplied to the computer through a recording medium or via wired/wireless communication. Examples of the recording medium for use in supplying the computer program includes a flexible disk, a hard disk, a magnetic recording medium such as a magnetic tape, an optical/magneto-optic recording medium such as MO, CD and DVD, and a nonvolatile semiconductor memory.

One example of the method for supplying the computer program via wired/wireless communication is a method utilizing a server on a computer network. In that case, a data file (program data file) capable of serving as the computer program to implement the present invention is stored in the server. The program data file can be in the form of an executable file or source code.

The program data file is supplied by downloading to a client computer which has accessed the server. In that case, the program data file can be divided into a plurality of segment files, and the segment files can be held in different servers in a distributed manner. In other words, the present invention involves the server for use in supplying, to the client computer, the program data file to realize the functions and the processes required in the present invention.

Further, a recording medium storing the encrypted form of the computer program to implement the present invention can be delivered to users and key information for decrypting the encrypted program can be supplied to the users satisfying predetermined qualifications so that only the qualified users can install the program into the computer. The key information can be supplied to the users by allowing them to download the key information from the home page via the Internet, for example.

The computer program to realize the functions of the exemplary embodiments by using the computer can realize the functions of the exemplary embodiments by utilizing the function of OS which is already installed in the computer to operate on it. Further, at least part of the computer program to implement the present invention can be presented as firmware for, e.g., an extension board additionally mounted to the computer, and the functions of the exemplary embodiments can be realized by utilizing a CPU incorporated in the extension board, for example.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-026994 filed Feb. 6, 2007, which is hereby incorporated by reference herein in its entirety.

What is claimed is:

1. A transfer apparatus for transmitting multicast packets of moving image data transmitted from a transmitter to receivers via a network, the transfer apparatus comprising:

a receiving unit configured to receive a multicast subscribe request from the receiver;

a transmitting unit configured to transmit the multicast packet to the receivers;

a determining unit configured to, in a case where the multicast subscribe request of the moving image data transmitted by the receiver of a first multicast group is received by the receiving unit when the transmitting unit is transmitting the multicast packet of the moving image data to receivers of a second multicast group, determine, in accordance with transfer start information in the header of the multicast packet received from the transmitter after receiving the multicast subscribe request from the receiver of the first multicast group, whether the multicast packet received after receiving the multicast subscribe request from the receiver of the first multicast group is a head packet of a frame coded by a first coding technique which does not require information of any other frames; and a control unit configured to control the transmitting unit such that the multicast packet is transmitted to the receivers of the second multicast group and is not transmitted to the receivers of the first multicast group in a case where the determining unit determined that the multicast packet received from the transmitter after receiving the multicast subscribe request from the receiver of the first multicast group is not the head packet of the frame coded by the first coding technique, and the multicast packet is transmitted to the receivers of both of the first and second multicast groups in a case where the determining unit determined that the multicast packet received from the transmitter after receiving the multicast subscribe request from the receiver of the first multicast group is the head packet of the frame coded by the first coding technique, wherein the control unit controls the transmitting unit such that succeeding multicast packets, which are received after the multicast packet transmitted to the receivers of both of the first and second multicast groups, are transmitted to receivers of both of the first and second multicast groups, and the determining unit determines, in a period from the receiving the multicast subscribe request transmitted by the receiver of the first multicast group until the determination of the multicast packet transferred to the receivers of both of the first and second multicast groups, whether the multicast packet is the head packet of the frame coded by the first coding technique.

2. A control method for a transfer apparatus for transmitting multicast packets of moving image data transmitted from a transmitter to receivers via a network, the control method comprising:

receiving a multicast subscribe request from the receiver;

transmitting the multicast packet to the receivers;

in a case where the multicast subscribe request of the moving image data transmitted by the receiver of a first multicast group is received in the receiving step when the multicast packet of the moving image data is being transmitted to receivers of a second multicast group in the transmitting step, determining, in accordance with transfer start information in the header of the multicast packet received from the transmitter after receiving the multicast subscribe request from the receiver of the first multicast group, whether the multicast packet received after receiving the multicast subscribe request from the receiver of the first multicast group is a head packet of a frame coded by a first coding technique which does not require information of any other frames; and controlling the transmitting step such that the multicast packet is transmitted to the receivers of the second multicast group and is not transmitted to the receivers of the first multicast group in a case where the determining step determined that the multicast packet received from the transmitter after receiving the multicast subscribe request from the receiver of the first multicast group is not the head packet of the frame coded by the first coding technique, and the multicast packet is transmitted to the receivers of both of the first and second multicast groups in a case where the determining step determined that the multicast packet received from the transmitter after receiving the multicast subscribe request from the receiver of the first multicast group is the head packet of the frame coded by the first coding technique, wherein the control step controls the transmitting step such that succeeding multicast packets, which are received after the multicast packet transmitted to the receivers of both of the first and second multicast groups, are transmitted to receivers of both of the first and second multicast groups, and the determining step determines, in a period from the receiving the multicast subscribe request transmitted by the receiver of the first multicast group until the determination of the multicast packet transferred to the receivers of both of the first and second multicast groups, whether the multicast packet is the head packet of the frame coded by the first coding technique.

3. A computer-readable storage medium storing a program causing a computer to execute a control method for a transfer apparatus for transmitting multicast packets of moving image data transmitted from a transmitter to receivers via a network, the control method comprising:

receiving a multicast subscribe request from the receiver;

transmitting the multicast packet to the receivers;

in a case where the multicast subscribe request of the moving image data transmitted by the receiver of a first multicast group is received in the receiving step when the multicast packet of the moving image data is being transmitted to receivers of a second multicast group in the transmitting step, determining, in accordance with transfer start information in the header of the multicast packet received from the transmitter after receiving the multicast subscribe request from the receiver of the first multicast group, whether the multicast packet received after receiving the multicast subscribe request from the receiver of the first multicast group is a head packet of a frame coded by a first coding technique which does not require information of any other frames; and controlling the transmitting step such that the multicast packet is transmitted to the receivers of the second multicast group and is not transmitted to the receivers of the first multicast group in a case where the determining step determined that the multicast packet received from the transmitter after receiving the multicast subscribe request from the receiver of the first multicast group is not the head packet of the frame coded by the first coding technique, and the multicast packet is transmitted to the receivers of both of the first and second multicast groups in a case where the determining step determined that the multicast packet received from the transmitter after receiving the multicast subscribe request from the receiver of the first multicast group is the head packet of the frame coded by the first coding technique, wherein the control step controls the transmitting step such that succeeding multicast packets, which are received after the multicast packet transmitted to the receivers of both of the first and second multicast groups, are transmitted to receivers of both of the first and second multicast groups, and the determining step determines, in a period from the receiving the multicast subscribe request transmitted by the receiver of the first multicast group until the determination of the multicast packet transferred to the receivers of both of the first and second multicast groups, whether the multicast packet is the head racket of the frame coded by the first coding technique.

\* \* \* \* \*